United States Patent
O'Donnell

(10) Patent No.: US 11,397,027 B2
(45) Date of Patent: Jul. 26, 2022

(54) CONDENSATE VALVE FOR FURNACE

(71) Applicant: BECKETT THERMAL SOLUTIONS, North Ridgeville, OH (US)

(72) Inventor: Michael J. O'Donnell, Avon, OH (US)

(73) Assignee: BECKETT THERMAL SOLUTIONS, North Ridgeville, OH (US)

( * ) Notice: Subject to any disclaimer, the term of this patent is extended or adjusted under 35 U.S.C. 154(b) by 0 days.

(21) Appl. No.: 17/278,389

(22) PCT Filed: Oct. 10, 2019

(86) PCT No.: PCT/US2019/055609
§ 371 (c)(1),
(2) Date: Mar. 22, 2021

(87) PCT Pub. No.: WO2020/077074
PCT Pub. Date: Apr. 16, 2020

(65) Prior Publication Data
US 2021/0356171 A1 Nov. 18, 2021

Related U.S. Application Data

(60) Provisional application No. 62/744,378, filed on Oct. 11, 2018.

(51) Int. Cl.
*F24H 3/00* (2022.01)
*F24H 8/00* (2022.01)
*F24H 9/16* (2022.01)
*F24F 13/22* (2006.01)

(52) U.S. Cl.
CPC ............ *F24H 9/16* (2013.01); *F24F 13/222* (2013.01)

(58) Field of Classification Search
CPC ..... F24H 3/00; F24H 3/06; F24H 8/00; F24H 8/006; F28F 17/00; F28F 17/005
See application file for complete search history.

(56) References Cited

U.S. PATENT DOCUMENTS

| | | | |
|---|---|---|---|
| 4,603,680 A * | 8/1986 | Dempsey | F23J 13/04 126/109 |
| 5,010,925 A | 4/1991 | Atkinson et al. | |
| 5,322,050 A * | 6/1994 | Lu | F24H 3/087 126/11 OR |

(Continued)

FOREIGN PATENT DOCUMENTS

CN 107715503 A 2/2018

*Primary Examiner* — Gregory A Wilson
(74) *Attorney, Agent, or Firm* — Tarolli, Sundheim, Covell & Tummino LLP

(57) ABSTRACT

A flue collector box for a furnace having a cooling coil, a heat exchanger, and an inducer blower includes a housing having an interior chamber in fluid communication with the heat exchanger such that condensation generated in the heat exchanger flows to the interior chamber of the housing. A valve is connected to the housing and includes a pair of lips defining a fluid passage through the valve in fluid communication with the interior chamber. The lips have an open condition allowing condensation to exit the valve when the inducer blower is deactivated. The lips have a closed condition forcefully engaging one another when the inducer blower is activated to prevent condensation from exiting the valve.

18 Claims, 3 Drawing Sheets

(56) References Cited

U.S. PATENT DOCUMENTS

| | | | | |
|---|---|---|---|---|
| 5,379,749 | A * | 1/1995 | Rieke | F24H 8/006 137/247.27 |
| 7,458,340 | B2 * | 12/2008 | Takeda | F24H 8/00 165/157 |
| 8,056,553 | B2 * | 11/2011 | Khan | F24H 3/087 126/11 OR |
| 9,261,292 | B2 * | 2/2016 | Sherrow | F24H 8/00 |
| 10,711,997 | B2 * | 7/2020 | Perez | F23L 17/005 |
| 2003/0070672 | A1 * | 4/2003 | Ho | F24H 8/006 126/11 OR |
| 2005/0092316 | A1 | 5/2005 | Schonberger | |
| 2011/0108139 | A1 | 5/2011 | Wright et al. | |
| 2012/0055465 | A1 * | 3/2012 | Khan | F24H 8/006 220/571 |
| 2012/0090591 | A1 | 4/2012 | Rieke et al. | |
| 2013/0108971 | A1 | 5/2013 | Maiello et al. | |
| 2018/0031340 | A1 * | 2/2018 | Wilson | F28F 13/06 |
| 2021/0207899 | A1 * | 7/2021 | Deivasigamani | F24H 8/006 |

* cited by examiner

US 11,397,027 B2

CONDENSATE VALVE FOR FURNACE

CROSS REFERENCES TO RELATED APPLICATIONS

This application filed under 35 U.S.C § 371 is a national phase application of International Application Serial Number PCT/US2019/055609 filed Oct. 10, 2019 which claims priority to U.S. Provisional Application 62/744,378, filed Oct. 11, 2018.

TECHNICAL FIELD

The present invention relates generally to a furnace and, more specifically, relates to a valve for removing condensate from a furnace.

BACKGROUND

Furnaces are being developed to meet the new ultra-low $NO_x$ requirements. The system of choice to meet those requirements is an induced draft premixed system. In order to work properly and maintain a desirable gas/air ratio, these systems are sealed from the gas-air mixer to the discharge of the draft inducer. Being a sealed system can present an issue for combination heating/air conditioning (AC) appliances in which the cooling coil is upstream of the gas-fired heat exchanger. Many of these appliances are mounted outdoors on rooftops or next to the structure being heated and cooled.

As a result, warm, moist air from the environment is able to enter the heat exchanger. During the cooling operation, cold air from the cooling coil passes over the heat exchanger and causes the warm moist air therein to condense. This condensate needs to be able to drain out of the heat exchanger to avoid causing damage or a dangerous operating condition. In a conventional inshot burner style furnace, the condensate drains out of the heat exchanger into the vestibule at the burner inlet opening. The burners in these applications are spaced apart from the heat exchanger inlet to allow secondary air to enter the burner for combustion. This space therefore allows for the easy drainage of water. With a sealed premixed burner, however, the condensation would collect and eventually fill the burner, causing damage and a potentially dangerous operating condition.

SUMMARY

In one example, a flue collector box for a furnace having a cooling coil, a heat exchanger, and an inducer blower includes a housing having an interior chamber in fluid communication with the heat exchanger such that condensation generated in the heat exchanger flows to the interior chamber of the housing. A valve is connected to the housing and includes a pair of lips defining a fluid passage through the valve in fluid communication with the interior chamber. The lips have an open condition allowing condensation to exit the valve when the inducer blower is deactivated. The lips have a closed condition forcefully engaging one another when the inducer blower is activated to prevent condensation from exiting the valve.

In another example, an HVAC unit includes a housing defining an interior space and having inlet and outlet openings in fluid communication with the interior space. A heat exchanger within the interior space is closer to the outlet opening. A cooling coil within the interior space is upstream of the heat exchanger and closer to the inlet opening. An inducer blower draws air through the heat exchanger. A flue collector box has a housing defining a chamber in fluid communication with the heat exchanger such that condensation generated in the heat exchanger flows to the chamber of the housing. A valve is connected to the housing and includes a pair of lips defining a fluid passage through the valve in fluid communication with the interior chamber. The lips have an open condition allowing condensation to exit the valve when the inducer blower is deactivated. The lips have a closed condition forcefully engaging one another when the inducer blower is activated to prevent condensation from exiting the valve.

Other objects and advantages and a fuller understanding of the invention will be had from the following detailed description and the accompanying drawings.

DETAILED DESCRIPTION

Figure 1:
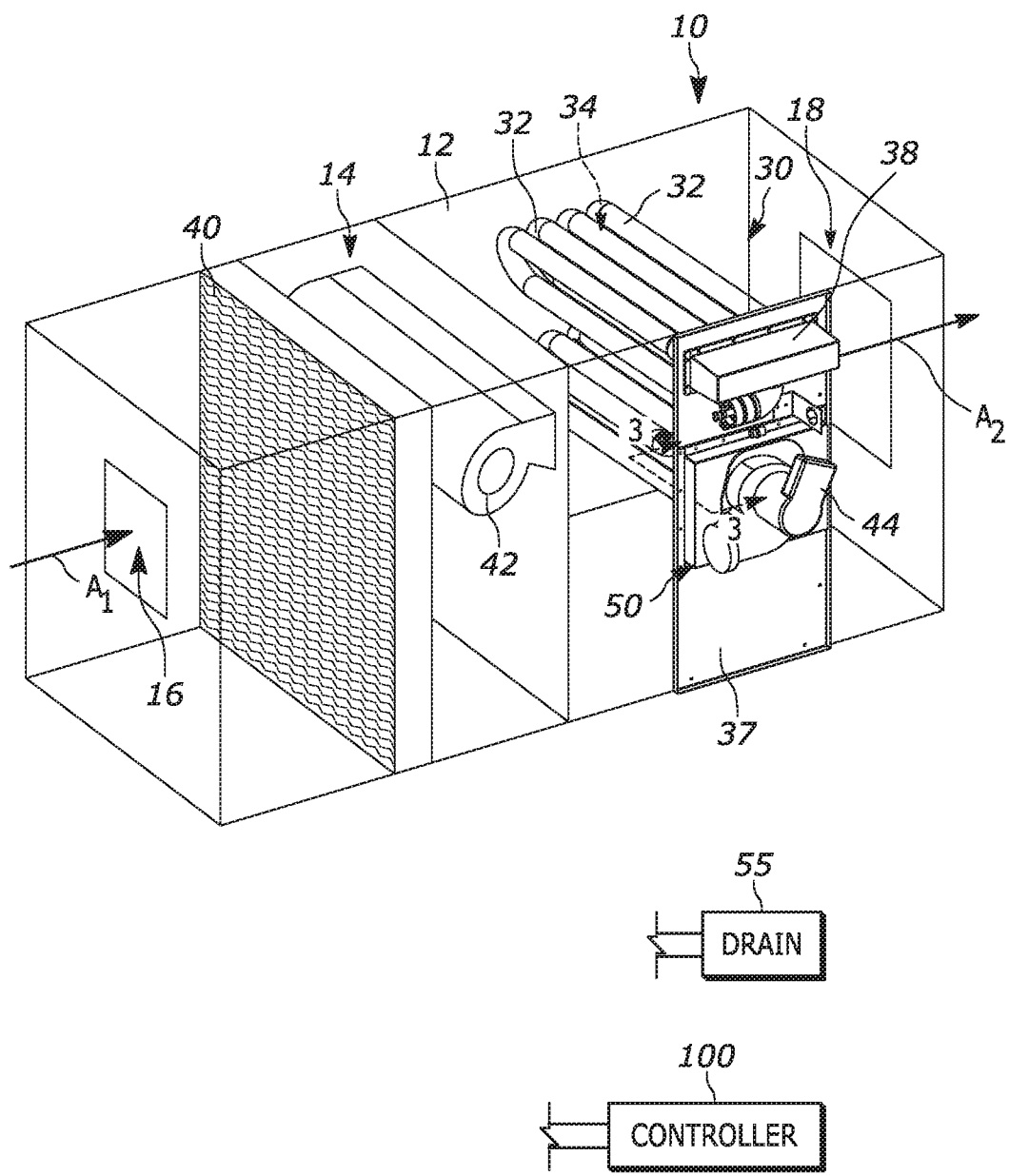
FIG. 1 is a schematic illustration of an HVAC unit including an example condensation valve.
Figure 2:
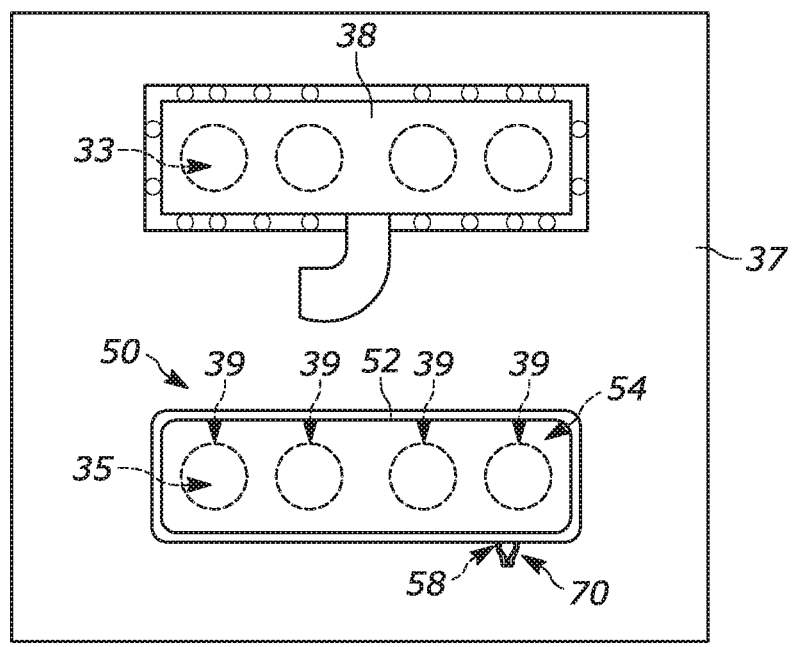
FIG. 2 is an enlarged view of a portion of FIG. 1.

The present invention relates generally to a furnace and, more specifically, relates to a valve for removing condensate from a furnace. FIGS. 1-2 illustrate an HVAC unit 10 including an example condensation drain or valve 70. Referring to FIG. 1, the HVAC unit 10 includes a housing 12 defining an interior space 14. Inlet and outlet openings 16, 18 are positioned at opposite ends of the housing 12 and are in fluid communication with the interior space 14.

A heat exchanger 30, cooling coil 40, circulating air blower 42, and inducer blower or fan 44 are provided in the interior space 14. In one example, the cooling coil 40 is located closer to the inlet opening 16. The heat exchanger 30 is located downstream of the cooling coil 40 closer to the outlet opening 18. The circulating air blower 42 is located downstream of the cooling coil 40. A controller 100 is electrically connected to the heat exchanger 30, cooling coil 40, circulating air blower 42, and inducer fan 44 for controlling operation thereof.

A panel 37 is provided in the interior space 14 downstream of the circulating air blower 42. The heat exchanger 30 is secured to the panel 37 and includes one or more serpentine heat exchanger tubes 32 with each including an inlet end 33 and an outlet end 35. A passage 34 extends the entire length of each tube 32 between the ends 33, 35. The tube 32 can be smooth along its length (as shown) or include confronting or longitudinally/radially offset dimples or indentations, e.g., the dimples shown and described in U.S. Pat. No. 8,459,342, the entirety of which is incorporated by reference herein. In any case, the tubes 32 are substantially aligned with the outlet opening 18 and the circulating air blower 42.

A burner 38 directs flames into the inlet ends 33 of the tubes 32. The burner 38 can be a pre-mix burner that delivers a pre-mixed mixture of air and combustible fuel to the tubes 32 or a non-pre-mix burner that utilizes secondary air in the combustion process. In any case, the burner 38 is secured to one side of the panel 37 and electrically connected to the controller 100. The inlet ends 33 are provided on the other side of the panel 37 in fluid communication with ports of the burner (not shown). The outlet ends 35 extend through associated openings 39 in the panel 37. The interface between the outlet ends 35 and openings 39 can be sealed in a fluid-tight manner.

Figure 3:
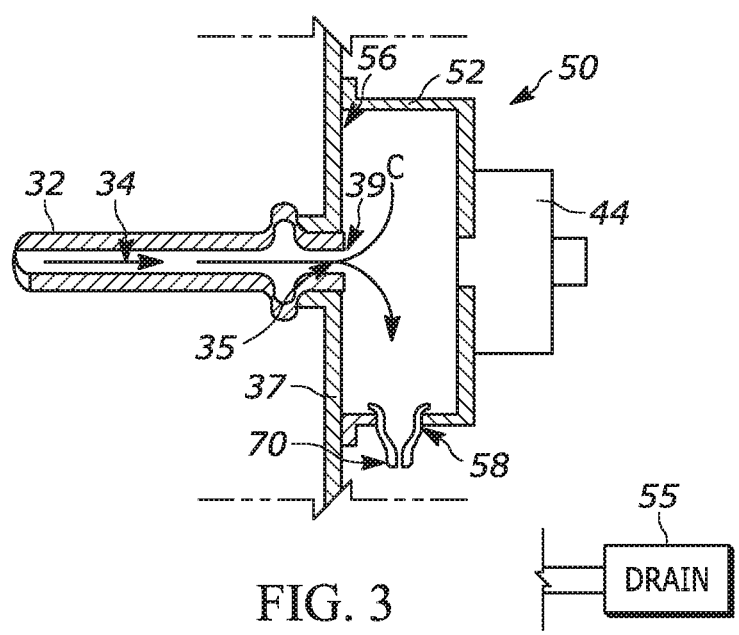
FIG. 3 is a section view taken along line 3-3 of FIG. 1.

As shown in more detail in FIGS. 2-3, a flue collector box 50 is secured to the same side of panel 37 as the burner 38, i.e., opposite the heat exchanger 30, and aligned with the outlet ends 35 of the tubes 32. The flue collector box 50 includes a housing 52 defining an interior space or chamber 54 and an inlet opening 56 in fluid communication with the chamber. The housing 52 is secured to the panel 37 such that inlet opening 56 is in fluid communication with the openings 39 in the panel, thereby placing the passages 34 of the tubes 32 in fluid communication with the chamber 54.

Additional inlet openings (not shown) can be provided in the housing and fluidly connected with other components of the furnace, e.g., the circulating air blower 42, cooling coil 40, etc. As shown, the inducer fan 44 extends through the housing 52 and is fluidly connected to the chamber 54. The flue collector box 50 can therefore be in fluid communication with one or more of the outlet ends 35 of the tubes 32, the cooling coil 40, and the inducer fan 44. As a result, any condensation that forms in these components during operation of the HVAC unit 10 can flow through the inlet opening(s) 56 into the chamber 54 of the flue collector box 50.

An outlet opening 58 extends through the housing 52 and is in fluid communication with the chamber 54. In one example, the inlet opening(s) 56 are provided at the top and/or sides of the housing 52 and the outlet opening 58 is provided at the bottom of the housing.

A drain or valve 70 is provided in the outlet opening 58 for selectively regulating the flow of fluid from the chamber 54 to outside the housing 52, e.g., to a vestibule in the housing 12 (not shown) or to an optional drain 55 and/or pump fluidly connected to the chamber. To this end, the valve 70 either allows fluid to exit the chamber 54 through the outlet opening 58 or prevents fluid from exiting the chamber through the outlet opening.

Figure 4A:
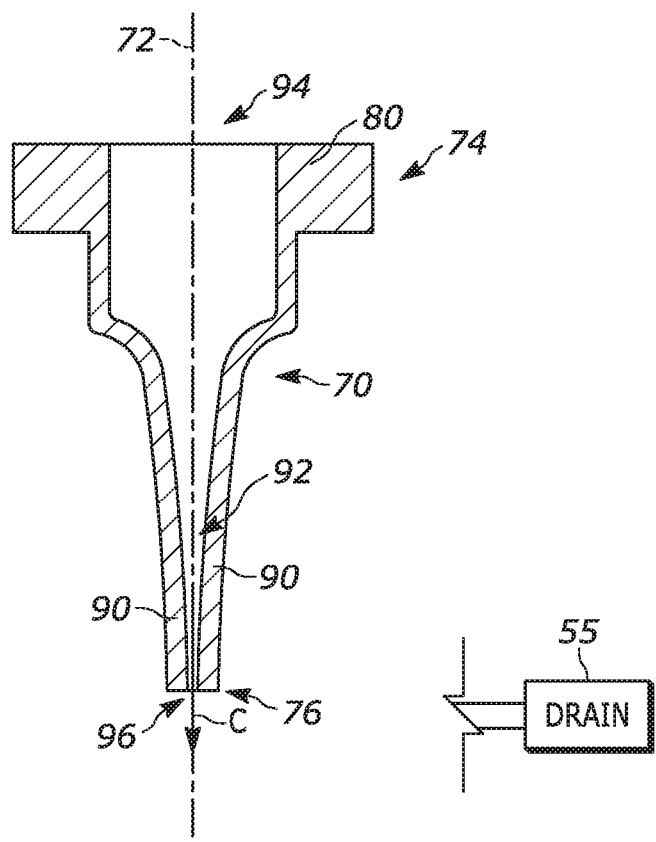
FIG. 4A is a section view of the drain of FIG. 1 in a first condition.
Figure 4B:
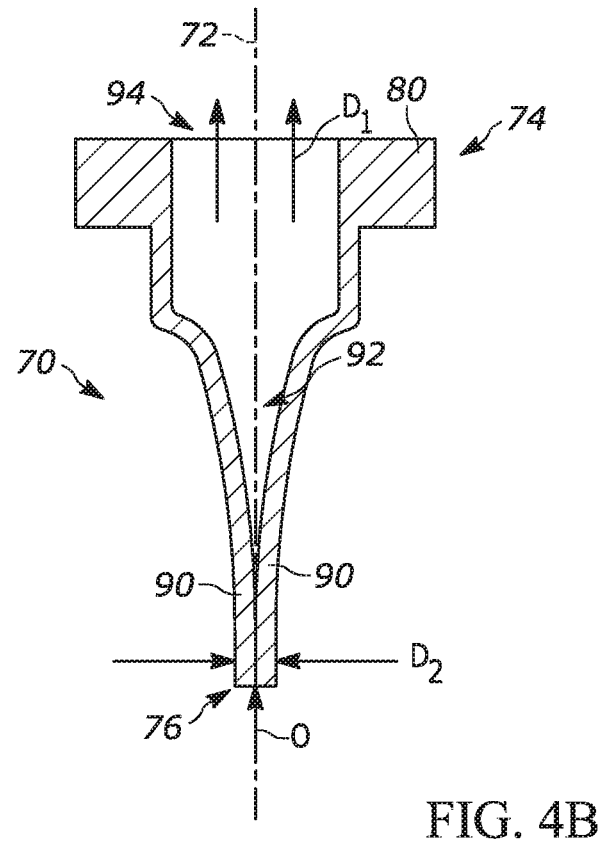
FIG. 4B is a section view of the drain of FIG. 1 in a second condition.

In one example, the valve 70 is a duckbill valve shown in more detail in FIGS. 4A-4B. The valve 70 extends along a centerline 72 from a first end 74 to a second end 76. The first end 74 includes a base 80 that extends through the outlet opening 58. The base 80 is secured within the outlet opening 58 to the housing 52 in a fluid-tight manner. Lips 90 made from a resilient or flexible material extend longitudinally from the base 80 on opposite sides of the centerline 72. A passage 92 extends the length of the valve 70 through the base 80 and between the lips 90. The passage 92 extends from an opening 94 at the first end 74 to a slit or opening 96 at the second end 76.

The lips 90 have an open first condition (FIG. 4A) resting against one another or spaced slightly apart to form the opening 96. In either case, fluid is capable of flowing or wicking through the opening 96 and exiting the valve 70 through the second end 76 thereof. The lips 90 have a collapsed or closed second condition (FIG. 4B) forcefully engaging one another at or adjacent the centerline 72 in a manner that holds the opening 96 closed to prevent fluid from exiting the valve 70 through the second end 76 thereof. The natural, stress-free condition of the lips 90 is the open first condition in which the fluid is free to flow or wick through the opening 96.

Referring back to FIG. 1, when the HVAC unit 10 is operating in air conditioning mode, i.e. during the cooling cycle, the circulating air blower 42 is activated to draw return air into the interior space 14 through the inlet opening 16 and past the activated cooling coil 40 in the manner indicated at $A_1$. The circulating air blower 42 helps deliver conditioned air to ducting via the outlet opening 18 in the manner indicated at $A_2$.

During operation of the HVAC unit 10, moist, warmer environmental air can enter the tubes 32. This can occur, for example, when the HVAC unit 10 is mounted outdoors on a rooftop or next to the structure being heated and cooled. As a result, the cooler, conditioned air $A_2$ creates condensation C (see FIG. 3) in the warmer tubes 32 as it passes over the tubes during the cooling cycle.

While this occurs, the inducer fan 44 and burner 38 are not operating or deactivated. There is therefore no forced airflow within the heat exchanger 30, flue collector box 50 or valve 70. As a result, the valve 70 exhibits the open condition in which the passage 92 is unobstructed and the opening 96 allows fluid flow therethrough. In other words, the lips 90 are in the open condition when the fluid passage 92 is free of air flow. Accordingly, any condensation C that forms within the HVAC unit 10 during the cooling cycle passes through the valve 70 to the drain 55 or vestibule. For example, and referring to FIGS. 3 and 4A, the condensate C forming in the heat exchanger tubes 32 passes through the inlet opening 56 in the flue collector box 50, flows into the chamber 54, and exits the flue collector box by passing/wicking through the unobstructed passage 92 and opening 96 in the valve 70.

During the heating season, it is desirable to operate the heat exchanger 30 but not the cooling coil 40. That said, the burner 38 and inducer fan 44 are activated during the heating cycle. The activated inducer fan 44 creates negative pressure air flow through the valve 70 in the manner indicated by the arrow $D_1$ in FIG. 4B. This causes the flexible lips 90 to move in the direction $D_2$ towards one another and ultimately forcefully engage one another at or near the centerline 72, thereby closing the opening 96 and obstructing the passage 92.

In other words, the lips 90 are positively or forcefully held in abutment with one another sufficient to prevent outside air (indicated by the arrow O) from entering the heat exchanger 30 by passing upwards through the valve 70 and into the flue collector box 50. Operating the inducer fan 44 during heating to place the valve 70 in the closed condition thereby prevents extraneous air from entering the system and possibly negatively affecting operation of the burner 38. Turning off the inducer fan 44 when heating is complete removes the negative air pressure in the valve 70 to allow the valve to return to the open condition, which would allow fluid flow through the valve if/when cooling begins again.

The valve described and shown herein is advantageous in that condensation is able to drain through the open valve during cooling but when the heat exchanger is operating negative pressure in the collector box generated by the induced draft blower causes the valve to collapse and close, thereby preventing outside air from undesirably entering the system.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A flue collector box for a furnace having a cooling coil, a heat exchanger, and an inducer blower, said flue collector box comprising:
   a housing having an interior chamber in fluid communication with the heat exchanger such that condensation generated in the heat exchanger flows to the interior chamber of the housing; and
   a valve connected to the housing and having a pair of lips defining a fluid passage through the valve in fluid communication with the interior chamber, the lips having an open condition allowing condensation to exit the valve when the inducer blower is deactivated, the lips having a closed condition forcefully engaging one another when the inducer blower is activated to prevent outside air from passing through the valve and into the housing.

2. The flue collector box of claim 1, wherein the valve is a duckbill style valve.

3. The flue collector box of claim 1, wherein the cooling coil is positioned upstream of the heat exchanger.

4. The flue collector box of claim 1, wherein the lips move from the open condition to the closed condition in response to negative air pressure within the fluid passage.

5. The flue collector box of claim 1, wherein the lips are in the open condition when the fluid passage is free of air flow.

6. The flue collector box of claim 1, wherein the lips are made from a resilient material.

7. The flue collector box of claim 1 further comprising at least one opening for receiving an outlet end of at least one tube of the heat exchanger.

8. The flue collector box of claim 1, wherein the valve extends through an opening in a bottom of the housing.

9. The flue collector box of claim 1, wherein the valve includes a base provided in the housing and the lips extend from the base through an opening in the housing to an exterior thereof.

10. An HVAC unit comprising:
    a housing defining an interior space and including inlet and outlet openings in fluid communication with the interior space;
    a heat exchanger within the interior space closer to the outlet opening;
    a cooling coil within the interior space upstream of the heat exchanger and closer to the inlet opening;
    an inducer blower for drawing air through the heat exchanger;
    a flue collector box defining a chamber in fluid communication with the heat exchanger such that condensation generated in the heat exchanger flows to the chamber of the flue collector box; and
    a valve connected to the flue collector box and having a pair of lips defining a fluid passage through the valve in fluid communication with the interior chamber, the lips having an open condition allowing condensation to exit the valve when the inducer blower is deactivated, the lips having a closed condition forcefully engaging one another when the inducer blower is activated to prevent outside air from passing through the valve and into the flue collector box.

11. The HVAC unit of claim 10, wherein the valve is a duckbill style valve.

12. The HVAC unit of claim 10, wherein the cooling coil is positioned upstream of the heat exchanger.

13. The HVAC unit of claim 10, wherein the lips move from the open condition to the closed condition in response to negative air pressure within the fluid passage.

14. The HVAC unit of claim 10, wherein the lips are in the open condition when the fluid passage is free of air flow.

15. The HVAC unit of claim 10, wherein the lips are made from a resilient material.

16. The HVAC unit of claim 10 further comprising at least one opening for receiving an outlet end of at least one tube of the heat exchanger.

17. The HVAC unit of claim 10, wherein the valve extends through an opening in a bottom of the flue collector box.

18. The HVAC unit of claim 10, wherein the valve includes a base provided in the flue collector box and the lips extend from the base through an opening in the flue collector box to an exterior thereof.

* * * * *